Oct. 18, 1966
JAMES E. WEBB 3,279,193
ADMINISTRATOR OF THE NATIONAL AERONAUTICS
AND SPACE ADMINISTRATION
METHOD AND CONSTRUCTION FOR PROTECTING HEAT SENSITIVE
BODIES FROM THERMAL RADIATION AND CONVECTIVE HEAT
Filed July 1, 1964 2 Sheets-Sheet 1
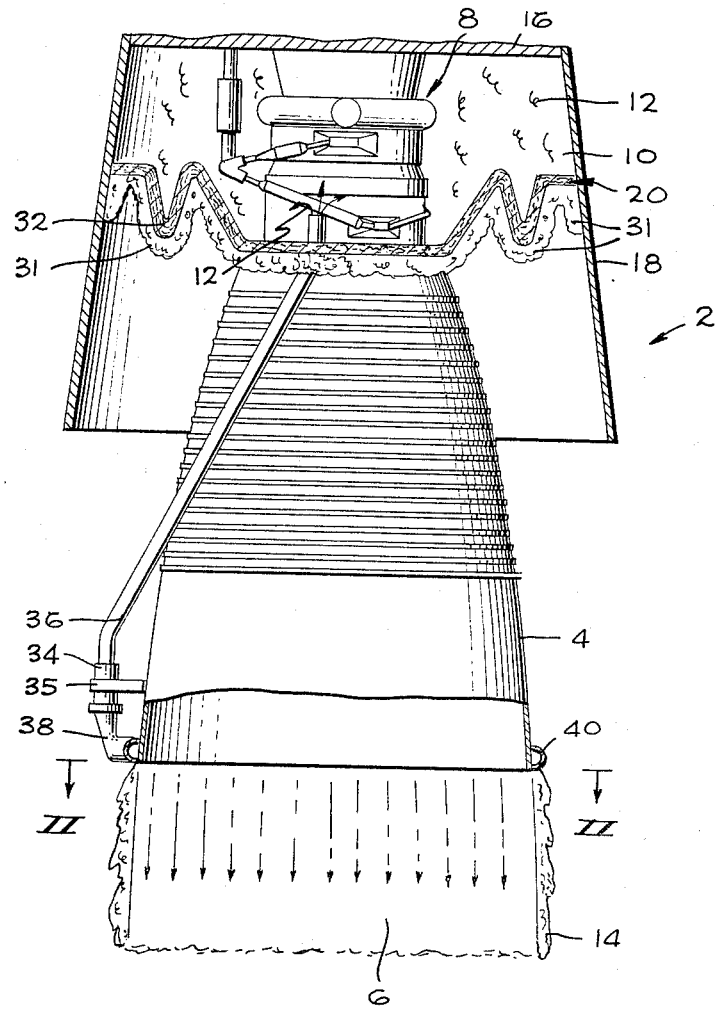
CASIMIR F. KUBIK
INVENTOR.
BY 9. McCoy
Howard B. Scheckman
ATTORNEYS Oct. 18, 1966 JAMES E. WEBB 3,279,193
ADMINISTRATOR OF THE NATIONAL AERONAUTICS
AND SPACE ADMINISTRATION
METHOD AND CONSTRUCTION FOR PROTECTING HEAT SENSITIVE
BODIES FROM THERMAL RADIATION AND CONVECTIVE HEAT
Filed July 1, 1964 2 Sheets-Sheet 2
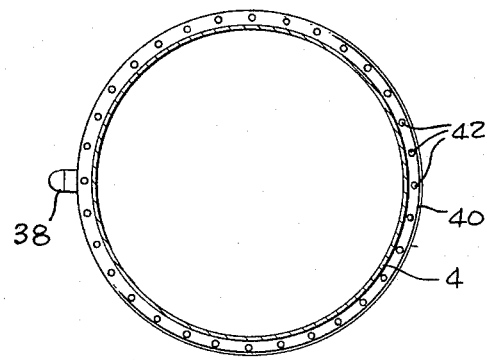
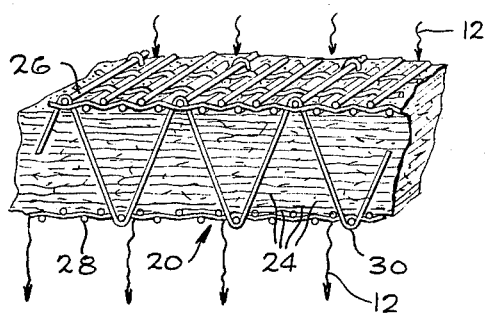
CASIMIR F. KUBIK
INVENTOR.
BY *signature*
*signature*
ATTORNEYS

United States Patent Office 3,279,193
Patented Oct. 18, 1966

3,279,193
METHOD AND CONSTRUCTION FOR PROTECTING HEAT SENSITIVE BODIES FROM THERMAL RADIATION AND CONVECTIVE HEAT
James E. Webb, Administrator of the National Aeronautics and Space Administration with respect to an invention of Casimir F. Kubik
Filed July 1, 1964, Ser. No. 379,771
14 Claims. (Cl. 60—266)

This invention relates to insulation against heat and more particularly to a method and construction for protecting areas, in which heat sensitive bodies are located, from the effects of thermal radiation and convective heat.

It is well known that excessive heat produced by a thermo engine such as, for example, a rocket engine, is sufficient to critically affect the strength and function of adjacent materials and components. Radiant heat alone can render the materials and components unreliable to perform the function for which they were built.

There are of course a number of well known ways of protecting bodies from radiant and convective heat. Just as an example, a vacuum bottle may be pointed out as one solution to this problem. The contents of the bottle are usually protected by double walls that are made reflective to retard radiant heat transfer, and a vacuum is maintained between the walls to retard convective heat transfer to the bottle's contents.

Another way of protecting a body from high radiant heat is to cover the body with an insulator made of a reflective tape over an ablative curtain. The reflective tape acts to primarily protect against radiant heat by reflection. And, the ablative curtain cools by evaporization.

However the above two illustrations and previous ways of providing heat protection, although of good efficiency, have drawbacks in a number of situations that make them poorly suited for use.

Just for example, it can be seen how difficult and expensive it would be to try to protect an area the size of a room or even a city from radiant heat, or an oddly shaped area with pipes or tubes running through it, or where repeated access to the bodies for maintenance purposes is needed. And, finally, with respect to spacecraft, the weight of the insulation system alone is sufficient to disqualify most systems of heat protection.

With the foregoing problems in mind it is generally an object of this invention to provide a way of protecting large and oddly shaped areas from radiant and convective heat.

It is another object of this invention to provide a construction for protecting areas against radiant and convective heat that is relatively light in weight and can be used where the saving on weight is an important consideration.

It is another object of this invention to provide a way of protecting areas from radiant and convective heat that is relatively inexpensive, easy to use, and provides access to the area.

Another object of this invention is to provide a way of protecting areas from radiant and convective heat that can be remotely operated to provide different degrees of protection keyed to the heat encountered, and varying from none to maximum protection.

Essentially, the invention teaches a method and construction of using an opaque fluid, such as smoke, as a protective covering for the heat sensitive bodies or components.

The smoke is positioned between the body and the heat source, to serve as a barrier that primarily blocks and reflects the radiations so that they do not reach the body. Also, the smoke is continually replenished to expel previously provided smoke that has been heated up to primarily prevent convective heat transfer to the body.

In addition the invention teaches that where necessary, the bodies or areas are protected from turbulence. Thus the smoke is contained within the area around the body, to prevent the smoke from being accidentally dispersed.

In the broadest aspects of the invention, an opaque highly reflective smoke distributed to cover a city could conceivably be used to protect the city from the thermal radiation of an atomic bomb. Or in its more narrow aspects, the opaque smoke can be used to protect heat sensitive components of a rocket where weight is an important consideration.

Other objects and advantages will appear from the following description considered in conjunction with the accompanying drawings, in which:

FIG. 1 shows a portion of a space vehicle incorporating the present invention in the jet propulsion section thereof, and showing the passage of smoke through the blanket barrier;

FIG. 2 is a cross-sectional view of FIG. 1 taken in the direction of arrows 2—2 showing a manifold to distribute smoke around the jet stream; and FIG. 3 is an enlarged detail of a portion of the blanket barrier shown in FIG. 1.

Description

For purposes of illustration, the embodiment of the invention is disclosed with respect to its use in a rocket.

Referring to the drawings, there is shown in FIG. 1, a section of a rocket indicated by arrow 2. The rocket section comprises in general, a nozzle 4 through which jet stream 6 is expelled, and various heat sensitive components indicated generally by numeral 8. These components are normally used in the operation of the rocket. And, while components 8 are shown located in area 10 close to the jet stream 6, they can be located anywhere in the rocket.

In the case of a rocket, there is an extreme amount of radiant heat emitted from the jet stream and nozzle. Two precautions are taken to protect heat sensitive components 8. First, the heat sensitive components are completely shrouded in opaque smoke 12 to protect them. And second, jet stream 6 is also shrouded in opaque smoke 14 to decrease the amount of heat radiated to components 8.

Components 8 are shown in FIG. 1 as located in area 10. The upper portion of area 10 is closed by an upper wall 16 that may be a bulkhead. The middle of the area is closed by an outer skirt structure 18 that may be the outer surface of the rocket. And, the bottom of area 10 is closed by a light weight porous blanket 20. A closed area is thus formed that is used to contain the smoke around the components.

Referring to FIG. 3, porous blanket 20 may be made from heat resistant wire mesh or silica glass fibers 24 sandwiched between heat resistant wire screens 26, 28 that are in turn stitched together by a wire 30. This construction results in a light weight barrier that is very suitable for space flight where weight plays such an important part in the success of a space mission.

Porous blanket 20 serves a number of functions. It serves to contain and distribute smoke 12 within enclosed area 10 by providing a restriction to its escape. It acts as a barrier and protects enclosed area 10 from external turbulences that could blow the smoke away from the area being protected. And, it permits excessively generated smoke 31 to flow through its surface to permit the blanket to resist the flow of convective and radiant heat. Referring to FIG. 1 it will be seen that the blanket is positioned to face the heat source so as to receive the brunt of the heat.

In FIG. 1, blanket 20 is shown with a pleat 32 in it. This provides a flexible joint that would be used with an engine that must gimbal for steering purposes. Where the engine is stationary, this pleated section may be omitted.

The rocket carries smoke generating means in the form of a generator 34. Generator 34 is carried by supporting structure shown diagrammatically by numeral 35.

One end of generator 34 is connected to pipe 36 that, in turn extends through blanket 20. Pipe 36 connects smoke generating means 34 with enclosed area 10 to guide opaque smoke 12 into the area.

The other end of generator 34, is interconnected by pipe 38 to smoke distribution manifold 40 (FIG. 2). This pipe serves to guide said opaque smoke into the manifold. Manifold 40 surrounds the outer periphery of the outlet of nozzle 4. It is circular and contains spaced holes 42 to provide for an even distribution of smoke. Smoke expelled from holes 42 expands and extends beyond nozzle 4 to form an envelope or shroud 14 that covers jet stream 6. The smoke reduces the radiant heat flux of the jet stream to adjacent components.

Smoke generator 34 is constructed so as to yield sufficient smoke to fill area 10 with smoke, shroud jet stream 6 and still provide an excess to replenish smoke that passes through blanket 20.

While a single smoke generator 34 is shown for simplicity, it will be obvious to those skilled in the art that separate gas generators can be supplied for each area desired to be protected. It is noted that it is advantageous to position the smoke generator as close to the area to be protected as practical. There will be less opportunity for the smoke to be heated up in traveling to the area it is to protect.

A typical smoke formulation used with a rocket may comprise a pressed grain combination of zinc dust and hexachlorethane carried within smoke generator 34. This, when burned, produces a thick gray smoke of finely divided zinc chloride that is inert and nonflammable so that it would be safe in an oxygen rich atmosphere.

*Operation*

In starting up the heat protective system, smoke generator 34 is normally started during countdown prior to firing the rocket. This is to make sure that the components are provided with a protective covering. The smoke generator may be remotely started through an electric ignition system (not shown) so as to start the material within the generator burning prior to take-off.

Once ignited, smoke will be guided by tube 36 through blanket 20 into area 10. The smoke will fill this area. As the pressure increases it will force previously fed smoke into and through the openings in the porous blanket 20 so as to fill the porous blanket with smoke 12 to protect the blanket and resist the effects of the radiant and convective heat.

Smoke from generator 34 will also be guided by pipe 38 into manifold 40 where it will issue from the series of opening 42 spaced around its periphery. The smoke leaves the manifold and forms a shroud 14 around jet stream 6 so as to cover it and decrease the amount of heat that radiates to components 8 in protected area 10.

The combination of shrouding the components and the jet stream will effectively decrease the radiation to which the components will be subjected. Although the drawings show both the jet stream and components shrouded in smoke, either way can be used to the exclusion of the other depending on the amount of protection desired.

It will be apparent to those skilled in the art that the selection of the characteristics of the smoke will depend on the type of protection desired. For example, a white opaque smoke will be a better reflector of radiant heat than a black opaque smoke.

The volume and duration of smoke generated can be varied extensively by changes in the formulation and grain configuration of the smoke producing agent. Thus, a very flexible system can be designed that can generate a greater or lesser quantity of smoke in anticipation of known requirements. Or, where requirements are not known, a series of smoke generators can be provided that can be remotely actuated for example by temperature sensors, or electronically, or by time fuses to turn the generators on or off or vary them to meet changing conditions.

Also, while there is shown a blanket arrangement 20 to prevent turbulence from dispersing the opaque smoke, under other conditions the turbulence may be advantageously used to carry the opaque smoke to the area being protected.

It should be understood that it is not intended to limit this invention to the herein disclosed form, but that the invention includes such other forms or modifications as are embraced by the scope of the appended claims.

What is claimed:
1. A method of protecting an area primarily from radiant and convective heat, comprising the steps of:
   (a) providing a supply of opaque gas;
   (b) positioning said opaque gas between said area and said radiant heat to protect said area against said radiant heat;
   (c) and, providing additional opaque gas to displace previously provided opaque gas to protect said area against convective heat.

2. A method as set forth in claim 1 wherein said opaque gas being provided is smoke.

3. A method as set forth in claim 2 wherein said opaque smoke that is being provided is inert and nonflammable.

4. A method of protecting an area primarily from radiant heat comprising the steps of:
   (a) providing an opaque smoke;
   (b) positioning said opaque smoke between said area and said radiant heat; and,
   (c) shielding said area from external turbulence to resist unwanted dispersion of said smoke.

5. A method as set forth in claim 4 including the step of providing additional opaque smoke to displace previously provided smoke to protect said area from convective heat.

6. In a construction for protecting an area primarily from radiant and convective heat, the combination comprising:
   (a) structure to provide a supply of opaque gas;
   (b) structure to position said opaque gas between said area and said radiant heat to protect said area against said radiant heat;
   (c) and, structure to permit said opaque gas to displace previously provided opaque gas to protect said area against convective heat.

7. A construction as set forth in claim 6 wherein said opaque gas is smoke.

8. A construction as set forth in claim 7 wherein said structure provides smoke that is made of inert and nonflammable constituents.

9. In a construction for protecting an area primarily from radiant heat the combination comprising:
   (a) structure to provide an opaque smoke;
   (b) structure to position said opaque smoke between said area and said radiant heat source; and,
   (c) structure to shield said area from outside turbulence to resist dispersion of said smoke.

10. A construction as set forth in claim 9 wherein said structure to provide opaque smoke is constructed to continuously provide said opaque smoke to displace previously provided smoke to protect said area from convective heat.

11. In a construction for protecting an area of a rocket containing heat sensitive components, from the radiant and convective heat of the rocket nozzle jet stream, the combination comprising:
   (a) structure carried by said rocket to enclose said area;
   (b) smoke generating means carried by said rocket to generate an opaque smoke;

(c) structure connecting said smoke generating means to said enclosed area to guide said opaque smoke into said area; and (d) said enclosing structure including a porous blanket portion positioned to face said radiant heat and through which excessively generated smoke flows to protect the blanket itself and resist the flow of convective heat.

12. In a construction for protecting an area of a rocket containing heat sensitive components, from the radiant and convective heat of the rocket nozzle jet stream, the combination comprising:

(a) first structure carried by said rocket to enclose said area;

(b) an opaque smoke generating means carried by said rocket to generate an opaque smoke;

(c) structure connecting said smoke generating means to said enclosed area to guide said opaque smoke into said area;

(d) said first structure including a porous blanket portion positioned to face said radiant heat and through which excessively generated smoke flows to protect the blanket itself and resist the flow of convective heat;

(e) a manifold carried by said rocket surrounding the outer periphery of said rocket nozzle outlet;

(f) structure interconnecting said manifold and said smoke generating means to guide said opaque smoke into said manifold; and (g) said manifold being constructed to direct said opaque smoke into an envelope that surrounds said jet stream as it emerges from said rocket nozzle.

13. In a construction for protecting an area of a rocket containing heat sensitive components, from the radiant and convective heat of the rocket nozzle jet stream, the combination comprising:

(a) first structure carried by said rocket to enclose said area;

(b) smoke generating means carried by said rocket and containing a pressed grain combination of zinc dust and hexachlorethane that produces a thick gray smoke of finely divided zinc chloride on burning.

(c) structure connecting said smoke generating means to said enclosed area to guide said opaque smoke into said area;

(d) said first structure including a porous blanket portion facing said radiant heat and made from heat resistant fibers sandwiched between woven screen members, and said blanket causing said smoke to diperse uniformly within said protected area while shielding said area from external turbulance, and through which excessively generated smoke flows to protect the blanket itself and resist the flow of convective heat;

(e) a manifold carried by said rocket surrounding the outer periphery of the outlet of said rocket nozzle;

(f) structure interconnecting said manifold and said smoke generating means to guide said opaque smoke into said manifold; and (g) said manifold being constructed to direct said opaque smoke into an envelope that surrounds said jet stream as it emerges from said rocket nozzle, to decrease the amount of radiant heat emitted from said jet stream to said protected area.

14. A method of protecting an area primarily from radiant heat, comprising the steps of:

(a) providing an opaque inert smoke; and (b) positioning said opaque inert smoke between said area and said radiant heat.

References Cited by the Examiner

UNITED STATES PATENTS

| | | | |
|---|---|---|---|
| 1,035,980 | 8/1912 | Lowry | 126—59.5 |
| 1,894,942 | 1/1933 | Chromy | 88—107 X |
| 2,373,214 | 4/1945 | Wolkenhauer | 88—107 |
| 2,439,553 | 4/1948 | Winn | 88—107 X |
| 2,489,751 | 11/1949 | Candler | 88—107 X |
| 2,537,011 | 1/1951 | Aparicio | 88—107 X |
| 2,708,340 | 5/1955 | Rainbow et al. | 60—35.6 |
| 3,091,924 | 6/1963 | Wilder | 60—35.6 |
| 3,092,963 | 6/1963 | Lawrence | 60—35.6 |

MARK NEWMAN, *Primary Examiner.*

CARLTON R. CROYLE, *Examiner.*